Patented June 24, 1941

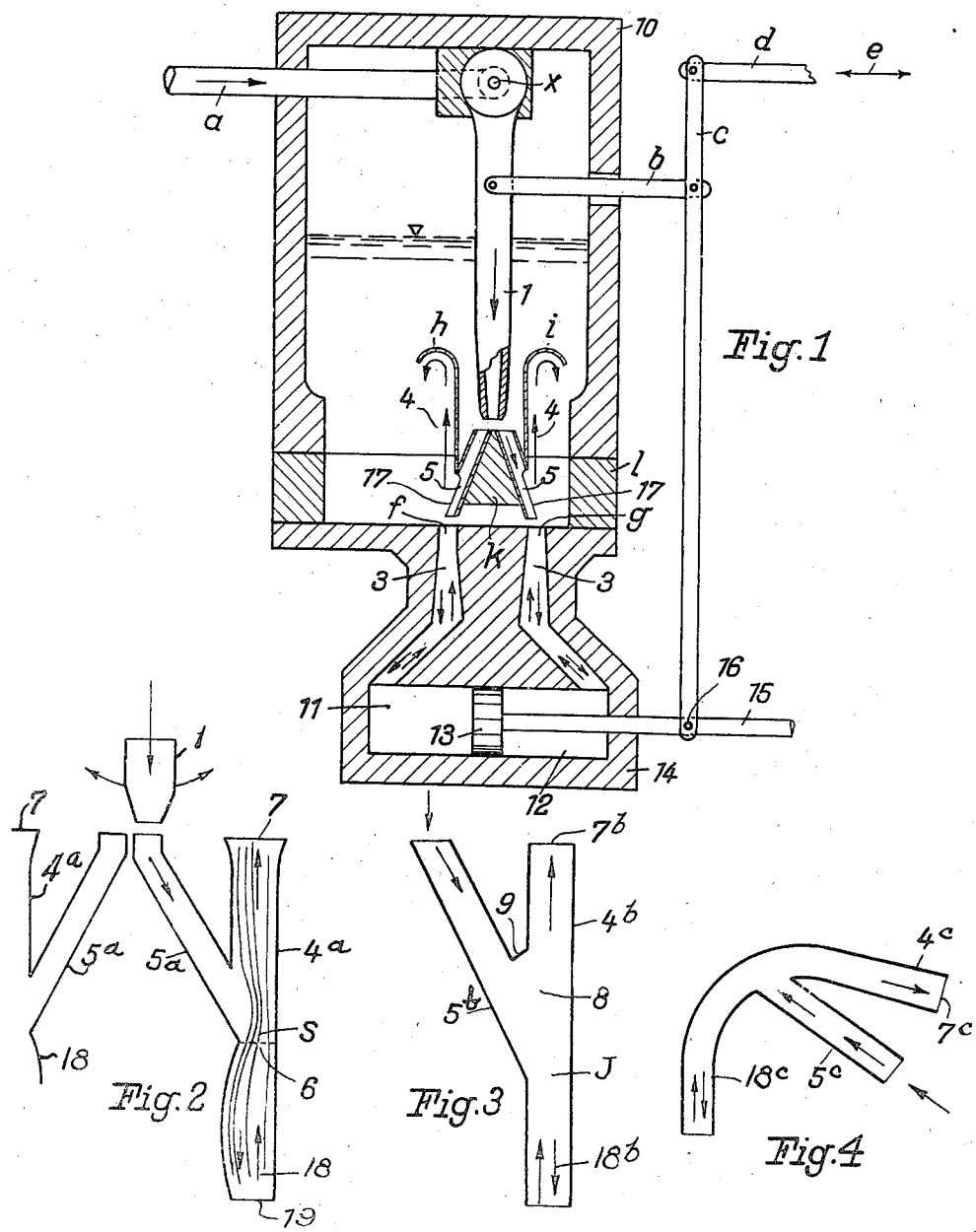

2,247,301

UNITED STATES PATENT OFFICE 2,247,301

MEANS FOR CONTROLLING PRESSURE FLUID

Otto Lesser, Berlin-Wilmersdorf, Germany, assignor to Askania-Werke A. G., a corporation of Germany Application June 7, 1938, Serial No. 212,336
In Germany June 9, 1937

16 Claims. (Cl. 121—38)

The invention concerns means for controlling a pressure fluid, which means are of the kind including one or more conduits for leading the stream of pressure fluid to a device to be operated thereby, e. g. a servo motor, and more especially the invention relates to pressure fluid control means which is particularly suited for use in mechanical regulators.

In pressure fluid control means of this kind, the pressure fluid enters the said conduit or conduits to an extent which varies according to the position of a power-switching member controlled, for example, by an impulse transmitting device. Irrespective of the number of pressure fluid conduits leading from the power switch to the device to be operated by the fluid, e. g. a servo motor, each conduit serves alternately for the inflow and for the discharge of the pressure fluid.

In the past, it has been found that the return stream of pressure fluid from the servo motor acts in a detrimental or disturbing manner in that it influences the power-switching member in an undesirable fashion.

To overcome this interference of the return flow upon the power-switching member, it has already been proposed to provide additional discharge openings, the opening of which was automatically to be controlled in accordance with the directon of flow of the pressure fluid and so that the issuing return stream could not affect the power-switching member. For the automatic control of the opening of the said additional discharge openings mechanical control members were to be used, which control members were automatically to be set in dependence on the direction of flow, that is to say so that they would first release the inflow to the servo motor and then release the return flow from the servo motor through the additional discharge openings.

Such mechanical control members could never be freed from a certain amount of inertia, so that they would always be more or less dependent on the frequency, and for the same reason, would introduce a phase displacement into the control. These drawbacks cannot be tolerated if high control velocities are required, and for example, in cases where measuring devices are concerned, the accuracy of measurement would be of course spoiled by a phase-displacement of the nature to which reference has just been made.

It is an object of this invention to overcome the difficulties outlined above, and they can be overcome if the use of the said additional mechanical control members is dispensed with and if, in accordance with the invention, the inflowing pressure fluid is directed into the pressure fluid conduit, or part thereof, which is to lead the fluid to the device (e. g. servo motor) to be operated angularly with respect thereto so that the fluid stream changes its direction of movement in entering the conduit, whereby on its return or discharge flow the stream of pressure fluid will tend to continue in the path given to it by the conduit between the device which has been operated and the position at which the inflow stream entered the conduit, and so will pass across the line of entry which was taken by the inflow stream and will thus leave the conduit in a direction different from, and angularly disposed with reference to that in which the inflow stream entered the conduit.

The invention can be carried into practice by providing the or each of said pressure fluid conduits, at the end thereof remote from the device to be operated, with a plurality of branch channels opening into the conduit and one or more of which branch channels serve for the introduction of pressure fluid to the said conduit and one or more serve for the discharge of the pressure fluid from the conduit, and constructing and arranging the junction of the branch with the conduit so that the return stream of pressure fluid is at this position directed or deflected away from the inflow branch channel or channels and into the outflow or discharge channel or channels, and this direction or deflection being effected without the interpolation of moving mechanical devices.

Generally, the object striven for will be the complete reception of the return stream of pressure fluid by the discharge channel. Cases can, however, be imagined in which it may be desirable to permit a comparatively small part of the return stream of pressure fluid to enter the inflow channel, in order, for example, when operating with a pressure fluid, to prevent a sucking-in of air through the inflow channel by means of the return stream.

The required deflection of the return stream of pressure fluid can be obtained in various ways.

One method, according to the invention, of deflecting the return stream of pressure fluid comprises constructing the junction of the branch channels with the conduit in such a way that at this part the cross section of the return stream of pressure fluid is deformed in relation to its previous cross section, for example, is constricted or split up.

The constriction of the return stream at the said junction results in an amplification of the directional force of the stream which prevents the stream flowing into the inflow branch channel. Furthermore, it is of importance that the constriction results in such a modification of the pressure conditions in the junction that a suction effect is set up in the inflow channel so that any of the pressure fluid entering the inflow channel is sucked up by the return stream and straightway discharged with the latter, an effect which can, fundamentally, also be obtained by means other than a constriction of the stream.

It is, for example, possible, without detrimentally affecting the whole control, to enlarge the outflow branch channel at that end which adjoins the junction or mouth-part of the branch channels with the conduit and at the inflow branch channel side thereof, beyond the cross-sectional area which the return stream of pressure fluid has directly prior to reaching the said junction on the return flow. Thus the return stream of pressure fluid located laterally of the inflow branch channel is caught up by the enlarged end of the discharge channel and deflected into the latter. This then is another method of obtaining the required deflection according to the invention.

A still further method, according to the invention, of obtaining the required deflection of the pressure fluid is to direct the return stream in the region of the said junction by centrifugal action. To this end, it is only necessary for the pressure fluid conduit to be arcuately formed in the direction of the return stream at the said junction in such a way that the inflow branch channel lies on the inside of the curve. The arcuate form of the conduit has the effect of forcing, by centrifugal action, the return stream of pressure fluid against the side of the said junction part opposite to the entrance of the inflow channel to the conduit.

Although, for the automatic control according to the invention, it is fundamentally immaterial at which part the conversion of the velocity of the inflow stream into pressure takes place, it is advisable, in cases where the power switch member is an injector nozzle adapted to feed the inflow branch channel, for this conversion to take place at the said junction of said branches and conduit, and to this end to give the inflow channel as constant a cross-section as possible up to this junction. By this means, the injector pipe may be arranged closer to the inflow channel or channels than has hitherto been usual or possible, and thus considerably to increase the accuracy and sensitivity of the control.

The appended drawing illustrates diagrammatically several ways of carrying this invention into effect, but these embodiments are to be regarded as illustrative only and not limitative.

In the drawing Fig. 1 is a part sectional plan of a mechanical regulator having this invention embodied therein; and Figs. 2, 3 and 4 are diagrammatic views each showing a modified method of obtaining the pressure fluid control in accordance with this invention.

Referring now to Fig. 1 of the drawing, it will be seen that this shows a fluid operated mechanical regulator which can be used for a variety of purposes such as controlling butterfly valves in pipe lines and so forth. The regulator shown in Fig. 1 comprises a fluid-tight casing 10 within which is pivoted at $x$ one end of an injector pipe 1 supplied with pressure fluid, for example, air or oil, by a pipe $a$.

The injector nozzle is connected through a system of rods $b$, $c$, $d$, all pivotally connected together with any suitable impulse transmitter, for example, with a diaphragm system upon which a differential pressure acts. Alternatively, for example, the impulse transmitter can be a gyroscope. However, the impulse transmitter forms no part of this invention, and is not illustrated in the drawing. The impulse transmitter is adapted to act on the rod $d$ in the directions of the arrow $e$ and thereby cause the injector pipe 1 to pivot towards the left or the right, as this pipe is seen in Fig. 1 of the drawing, so that fluid is admitted to different extents into two pressure fluid conduits 3, 3 provided in one end of the casing 10 and leading to the opposite sides 11 and 12 respectively of the piston 13 of a servo motor 14, the piston rod 15 of which is pivoted at 16 to the rod $c$.

The rod $c$ is connected to the piston rod 15 in order to effect a return of the injector pipe through the medium of the rod $b$. If, for example, the rod $b$ is moved to the left hand by the impulse transmitter, the rod $c$ is pivoted in the same direction and the injector pipe 1 is moved about its axis, in clockwise direction. This represents a pressure increase on the left hand side of the servo piston 13 so that this moves to the right hand and thus operates the member to be adjusted, for example, a valve, fluid flap or the like in the desired direction. In its movement, however, the piston 13 also imparts to the return rod $c$ an anti-clockwise rocking movement. By this means the injector pipe 1 is returned to its middle position between the two pressure fluid conduits 3, 3. As is known, this return has the effect of bringing back the injector pipe 1 into its middle position before the impulse actually moves the rod $b$ to the right and thereby exerts a return effect on the injector pipe. If one were to wait long enough for the return movement to take place under the action of the change in impulse, the regulating action would oscillate continually.

The mechanism described above in detail is one form of apparatus to which this apparatus is particularly applicable and is already known.

The present invention is concerned with the method of leading the pressure fluid from the injector nozzle or pipe 1 to the cylinder of the servo motor 14 and discharging this fluid from this cylinder.

The apparatus shown in Fig. 1 embodies the present invention and as will be seen, it includes a pair of diverging pressure fluid inflow channels 5, 5 disposed with their outer ends (as seen in Fig. 1 of the drawing) immediately below the tip of the injector pipe 1 and centrally with respect to the latter injector pipe when this is in its middle position, as shown.

Each of the channels 5 discharges into the upper end of a conduit 3 at an acute angle to the axis of the part of the conduit 3 immediately adjacent and below the entry of the channel 5 into the stream path of the conduit 3.

Each of the conduits 3 are of elbow formation as shown, and the upper ends of the conduits are substantially each perpendicular to the inner face of the end of the casing 10 in which they are formed.

The upper parts of the channels 5 are conveniently tubular, but the lower outer front halves of the channels 5 are cut away at 17, as shown.

Thus, when a stream of pressure fluid is directed into one of the channels 5 by the injector pipe 1, this stream of fluid passes down the channel 5 and is directed at an acute angle into the corresponding conduit 3 where its direction of motion is abruptly changed, after which the stream follows the course of the conduit 3 and eventually passes to the cylinder 11 of the servo motor.

This, of course, moves the piston 13 either to the right or left according to which end of the cylinder the fluid stream enters. On the return motion of the piston 13, the pressure fluid in the cylinder is forced therefrom through the conduit 3 by which it originally entered the cylinder and this pressure fluid leaves the discharging orifice $f$ or $g$ of the conduit at an acute angle to the axis of the inflow channel 5 and cuts entirely across the end of this channel and passes into the interior of the casing 10 in a direction away from the injector pipe 1. In this respect it is to be noted that the return flow of pressure fluid would enter the channel 5 in case the lower outer front halves of this channel were not cut away as at 17. Further to ensure that the discharge fluid shall not interfere with the injector pipe 1, guards $h$ and $i$ may be provided on either side of the injector pipe.

It will be seen that the channels 5 do not actually enter the conduits 3, but are slightly spaced therefrom, and it will also be appreciated that by cutting away, the outer sides 17 of the channels 5, no interference of the discharged stream of pressure fluid results from the channels 5. The arrangement of the channels 5 with respect to the conduits 3 and the interruption therebetween as shown in Fig. 1 has the effect of ensuring that pressure fluid being fed to the servo motor always reaches the latter and does not escape, whilst when pressure fluid leaves the cylinder of the servo motor, and returns through the conduit all this pressure fluid escapes into the casing 10 and none of it passes by the corresponding inflow channel 5 unless by special design for the purpose of sealing the inflow pipe, as will be hereinafter referred to.

It will be seen therefore that with a piece of apparatus constructed as above described and in which the openings $f$ and $g$ are suitably proportioned and suitably disposed with respect to the inflow channels 5, the return stream of pressure fluid will be directed in such a way as to represent a deflection from the inflow channel 5 and that on the other hand the inflow stream of pressure fluid is taken up as completely as possible by the openings $f$ and $g$ and thus does not get free at the point of interruption between the channels 5 and the conduits 3. It will also be appreciated that no moving mechanical parts are employed for controlling the flow of the pressure fluid from the channels 5 to conduits 3 and from conduits 3 back into the casing 10.

As experience has taught, in the well known jet pipe relay the pressure fluid passing out of the jet pipe substantially enters the channel 5 in case the discharge opening of the jet pipe is exactly opposite the reception orifice of one of the channels 5. For this reason the pressure fluid flow will be received by the openings $f$ and $g$ after having passed through the channel 5. It is possible that the interruption between the channels 5 and the conduits 3 results in a pressure loss. However, this pressure loss may be kept substantially small so as to prevent any disturbing influence on the operation of the entire device, as well as on the advance obtained by the subject matter of the invention.

As shown in Fig. 1, the channels 5 are carried by a support member $k$ forming an integral part of frame $l$ arranged to be mounted to complete the casing 10. The guards $h$ and $i$ mentioned above may be fastened in any convenient manner to the channels 5 as shown in Fig. 1.

In the embodiment shown in Fig. 2 the conduit likewise communicates with the servo-motor shown in Fig. 1. In this embodiment the required control of the fluid in its flow to and from the servo-motor cylinder 11 is obtained by providing separate conduits 18 each having two branch pipes 4a and 5a, 4a being the discharge or outflow conduit and 5a being the inflow conduit, and in constructing the junction of these branch channels with the conduit 18 in such a way that on the one hand there is no danger of pressure fluid being fed to the servo-motor flowing away through the discharge channel 4a and on the other hand there is no danger of the fluid being discharged passing into the inflow channel 5a.

As will be seen from Fig. 2, the cross sectional area of each conduit 18 is constricted at 6 between the entry of the channel 5a into the conduit 18 and the delivery end 19 of the conduit.

It will be appreciated that by this means the return stream of pressure fluid passing through the conduit 18 is constricted in the region of the junction S of the branch channels 4a and 5a of the conduit 18. The constriction at 6 is shown in Fig. 2 as being provided at the side of the conduit 18 into which the channel 5a enters the latter.

As also will be seen from the drawings, the discharge channel 4a is opposite from and in a straight line with the conduit 18 whilst the inflow channel 5a makes an acute included angle with the discharge channel 4a.

With a construction of conduits and branch channels as just described, it is practically impossible for the return stream of pressure fluid to enter the inflow channel 5a even to a small extent, and this is especially the case if the discharge channel 5a is enlarged towards the discharge opening 7, as indicated, for example, in the drawings. On the other hand, the inflow stream directed into the conduit 18 will enter the servo-motor so as to actuate the servo-motor piston. Obviously, the inflow stream after having passed through the channel 5a tends to enter the conduit 18 instead of the discharge channel 4a. It is self-evident that the constriction 6 must have a predetermined minimum cross-section so as to prevent the inflow stream from flowing through the discharge channel 4a.

The embodiment of the invention shown in Fig. 3 is in some respects very similar to that shown in Fig. 2, but in this case the conduit 18b is not constricted, but instead the discharge channel is enlarged at the end 8 adjoining the junction J, the enlargement being effected on the inflow channel side of the channel 4b.

This enlargement of the inner end of the channel 4b is selected so that the current streams of the return flow of pressure fluid passing along the conduit 18b towards the discharge channel 4b and which may tend to diverge towards the inflow channel 5b are caught up by the enlarged end of the discharge channel 4b and deflected into and along the latter. This trapping and collecting of the pressure fluid being discharged is assisted by the provision of an oblique surface 9 at the enlarged mouth of the discharge channel 4b.

The embodiment of the invention illustrated in Fig. 4 is based on the principle of directing the return stream of pressure fluid past the neighborhood of the entry of the inflow channel 5c by centrifugal action. It will be seen that in this construction, the conduit 18c is at the end remote from that which delivers to the servomotor, made arcuate and merges in a smooth curve into an arcuate inner end portion of the discharge channel 4c. At the junctions of the conduit 18c and discharge channel 4c, the inflow channel enters the arcuate duct so formed at an acute angle to the axis of the rectilinear part of the discharge channel 4c so that inflowing pressure fluid passes down the channel 5c, makes a sharp or sudden change of direction and then passes down the conduit 18c. The inflow channel 5c is on the inside of the arcuate portion of the conduit 18c and discharge channel 4c.

When the pressure fluid is being discharged from the servo motor, it passes by the conduit 18c around the bend in the latter on the outer wall thereof under the action of centrifugal force and across the mouth of the inflow channel 5c and therefore across the path that the inflow stream would normally take and then on into the discharge channel 4c which insures a positive discharge of the outflowing pressure fluid in a direction away from the injector pipe 1. In this way the discharge fluid is safely guided past the inflow channel 5c and none of it passes into the latter.

In all the embodiments described, the inflow channel 5 is arranged at an acute angle to the discharge channel or the axis along which discharge actually takes place, and it is advisable to make this angle, so far as practical considerations permit, as small as possible, since the efficiency of the devices increases as this angle decreases.

I claim:

1. For a device operated by pressure fluid, pressure fluid controlling means comprising a conduit serving for the flow of pressure fluid to and from the device to be operated, a pressure fluid inflow channel directed into said conduit and towards the end of the latter adapted to deliver to the device to be operated, and the inflow channel having that part adjacent the conduit angularly disposed with reference to the axis of the portion of the conduit adjacent the position of entry of the channel means to the conduit, said conduit also having, adjacent the said position of entry of inflow stream an uncontrolled discharge port for the pressure fluid on its return flow, said port being constantly open and constantly subject to atmospheric pressure, said conduit always communicating with said open port and the portion of said conduit adjacent to the entry of said inflow channel thereto, and between the latter and the end of the conduit adapted to deliver to the device to be operated, being adapted to direct the outflow stream of pressure fluid across the conduit entry end of said inflow channel to said discharge port so as to prevent the major portion of the outflow stream from entering said inflow channel.

2. For a device adapted to operate under the action of fluid pressure, pressure fluid controlling means comprising a conduit serving for the flow of pressure fluid to and from the device to be operated, a pressure fluid inflow channel directed into said conduit and towards the end of the latter adapted to deliver to the device to be operated, and the inflow channel having that part adjacent the conduit angularly disposed with reference to the axis of the portion of the conduit adjacent the position of entry of the channel means to the conduit, nozzle means for projecting pressure fluid into said inflow channel, discharge means for the return stream of pressure fluid adapted to discharge in a direction away from said nozzle, such discharge means being disposed adjacent the entry of said inflow channel to the conduit but further than such entry from the end of said conduit adapted to deliver to the device to be operated, and the portion of the said conduit adjacent the entry of the said inflow channel thereto, and between the latter and the said delivery end of the conduit, being adapted to direct the outflow stream of pressure fluid to said discharge means across the conduit entry end of the said inflow channel.

3. For a device adapted to operate under the action of fluid pressure, pressure fluid controlling means comprising a conduit serving for the flow of pressure fluid to and from the device to be operated, a pressure fluid inflow channel directed into said conduit and towards the end of the latter adapted to deliver to the device to be operated, and the inflow channel having that part adjacent the conduit angularly disposed with reference to the axis of the portion of the conduit adjacent the position of entry of the channel means to the conduit, power switching means for projecting pressure fluid into said inflow channel, discharge means for the return stream of pressure fluid adapted to discharge in a direction away from said power switching means, such discharge means being disposed adjacent the entry of said inflow channel to the conduit but further than such entry from the end of said conduit adapted to deliver to the device to be operated, and the portion of the said conduit adjacent the entry of the said inflow channel thereto, and between the latter and the said delivery end of the conduit, being directed towards said discharge means and being constricted.

4. For a device adapted to operate under the action of fluid pressure, pressure fluid controlling means comprising a conduit serving for the flow of pressure fluid, a pressure fluid inflow channel directed into said conduit at an acute angle to the axis of the portion of the conduit adjacent the entry thereto of said inflow channel, nozzle means adapted to project pressure fluid into said inflow channel, discharge means for the return stream of pressure fluid adapted to discharge, in a direction away from said nozzle, such discharge means being disposed adjacent the entry of said inflow channel to the conduit but further than such entry from the end of said conduit adapted to deliver to the device to be operated, and the portion of the said conduit adjacent the entry of the said inflow channel thereto, and between the latter and the said delivery end of the conduit, being directed towards said discharge means and being constricted on the side of the conduit at which said inflow channel enters it.

5. For a device adapted to operate under the action of fluid pressure, pressure fluid controlling means comprising a conduit serving for the flow of pressure fluid to and from the device to be operated, a pressure fluid inflow channel directed into said conduit and towards the end of the latter adapted to deliver to the device to be operated, and the inflow channel having that part adjacent the conduit angularly disposed with reference to the axis of the portion of the conduit adjacent the position of entry of the channel means to the conduit, power switching means for projecting pressure fluid into said inflow channel, a discharge channel joining said conduit adjacent the junction of the said inflow channel therewith and disposed at an acute angle to the inflow channel, such discharge channel being enlarged in cross sectional area at its outer end part, and the portion of the said conduit adjacent the entry of the said inflow channel thereto, and between the latter and the said delivery end of the conduit, being directed towards said discharge channel and being constricted.

6. For a device adapted to operate under the action of fluid pressure, pressure fluid controlling means comprising a conduit serving for the flow of pressure fluid to and from the device to be operated, a pressure fluid inflow channel directed into said conduit and towards the end of the latter adapted to deliver to the device to be operated, and the inflow channel having that part adjacent the conduit angularly disposed with reference to the axis of the portion of the conduit adjacent the position of entry of the channel means to the conduit, power switching means for projecting pressure fluid into said inflow channel, a discharge channel for the return flow of pressure fluid coming from the device to be operated, said discharge channel having a constantly open discharge port, said discharge channel being disposed at an acute angle to the inflow channel, and such discharge channel being enlarged in cross sectional area at the inner end adjacent the junction of the inflow channel with the said conduit, and said enlargement being disposed on the side of the discharge channel nearest the said inflow channel.

7. For a device adapted to operate under the action of fluid pressure, pressure fluid controlling means comprising a conduit for the flow of pressure fluid to and from the device to be operated, a pressure fluid inflow channel directed into said conduit at an acute angle to the axis of the portion of the conduit adjacent the entry thereto of said inflow channel, nozzle means adapted to project° pressure fluid into said inflow channel, a discharge channel having a constantly open discharge port, said channel joining said conduit adjacent the junction of the said inflow channel therewith and disposed at an acute angle to the inflow channel, and such discharge channel being enlarged in cross sectional area at the inner end adjacent the junction of the inflow channel with the said conduit, and said enlargement being disposed on the side of the discharge channel nearest the said inflow channel, and an inclined surface being provided at the junction of the adjacent walls of said inflow and discharge channels and adapted further to assist the direction of the outwardly flowing stream of pressure fluid to the discharge channel so as to prevent the major portion of the discharge flow from entering said inflow channel.

8. For a device adapted to operate under the action of fluid pressure, pressure fluid controlling means comprising a conduit serving for the flow of pressure fluid to and from the device to be operated, a discharge channel communicating with the outer end of the said conduit, and this discharge channel and conduit merging into one another in a smooth arc, and an inflow channel disposed on the inside of said arc and entering the conduit on the inside of the arcuate portion thereof and adapted to discharge into the conduit.

9. For a device adapted to operate under the action of fluid pressure, pressure fluid controlling means comprising a conduit serving for the flow of pressure fluid to and from the device to be operated, said conduit having at its outer part an arcuate portion terminating in pressure fluid discharging means, an inflow channel, disposed on the inner side of the curved part of the curved portion of said conduit, entering the latter in this curved part and at an acute angle to said discharge means, and injector means adapted to project pressure fluid into said inflow channel means.

10. A jet pipe relay comprising a movable jet pipe, means to supply pressure fluid thereto, a servo motor, two conduits adapted each to serve for the flow of pressure fluid to and from the cylinder of the servo motor, means for conducting pressure fluid from said jet pipe into said conduit with a sudden change of direction on entering the latter and means for discharging return pressure fluid from said conduit in a smooth path and without sudden change of direction.

11. A jet pipe relay comprising a pivotal jet pipe, means to conduct pressure fluid thereto, a chamber, a conduit adapted to serve to conduct pressure fluid to and from said chamber, a movable member within said chamber adapted to operate under the pressure fluid introduced into said chamber, means to adjust automatically the position of said jet pipe, an inflow channel extending from adjacent said jet pipe to said conduit and delivering into the latter at an acute angle to the adjacent part thereof, a discharge port for the pressure fluid on its return flow, said port being constantly open independent of the position of said jet pipe, said conduit having between its delivery end and the said inflow channel, a portion without sudden change of direction and at the junction of said inflow pipe therewith the conduit has its axis directed across the axis of the mouth of the inflow channel at an acute angle so as to prevent the major portion of the discharge flow from entering said inflow channel.

12. Apparatus according to claim 4, wherein said inflow channel is of constant cross sectional area throughout.

13. Apparatus according to claim 7, wherein said inflow channel is of constant cross sectional area throughout.

14. Apparatus according to claim 9, wherein said inflow channel is of constant cross sectional area throughout.

15. A pressure fluid operating control device, comprising a servo-motor, a relay for controlling the fluid pressure acting on the servo-motor, a conduit communicating with said servo-motor for the flow of pressure fluid to and from said motor, a pressure fluid inflow cnannel connected to said conduit at an acute angle to the axis of the portion of said conduit adjacent to its entry, a discharge port for the return flow of the pressure fluid coming from said servo-motor, said port being constantly open independent of the controlling operation of said relay, the junction of said conduit and said inflow channel being so formed that the return flow is directed at said junction away from said inflow channel to said discharge opening so as to prevent the major portion of the return flow from entering said inflow channel.

16. A pressure fluid operated control device comprising, a servo-motor, a relay for controlling the fluid pressure acting on said servo-motor, a conduit communicating with said servo-motor for the flow of pressure fluid to and from said motor, a pressure fluid inflow channel connected to said conduit at an acute angle to the axis of the portion of said conduit adjacent to its entry, a discharge port for the return flow of the pressure fluid coming from said servo-motor, said port being constantly open independent of the controlling operation of said relay, said conduit being so formed that the return flow is directed away from said inflow channel to said discharge opening so as to prevent the major portion of the return flow from entering said inflow channel.

OTTO LESSER.